United States Patent
Seeberger et al.

(10) Patent No.: US 6,185,872 B1
(45) Date of Patent: *Feb. 13, 2001

(54) VEHICLE DOOR

(75) Inventors: Jürgen Seeberger, Baunach; Sabine Neuss, Coburg; Eberhard Pleiss, Untersiemau, all of (DE)

(73) Assignee: Brose Fahrzeugteile GmbH & Co. KG, Coburg (DE)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/913,296

(22) PCT Filed: Mar. 14, 1996

(86) PCT No.: PCT/DE96/00507

§ 371 Date: Jul. 17, 1998

§ 102(e) Date: Jul. 17, 1998

(87) PCT Pub. No.: WO96/28314

PCT Pub. Date: Sep. 19, 1996

(30) Foreign Application Priority Data

Mar. 15, 1995 (DE) .............................. 195 09 282

(51) Int. Cl.[7] ..................................................... B60J 5/04
(52) U.S. Cl. ............................................................ 49/502
(58) Field of Search .................. 49/502, 503; 296/146.1, 296/146.5, 146.7, 35.2; 280/730.2

(56) References Cited

U.S. PATENT DOCUMENTS

| 4,882,842 | 11/1989 | Basson et al. ............... 296/146.7 X |
|---|---|---|
| 4,919,470 | 4/1990 | Müller .................................. 296/153 |
| 5,062,240 | 11/1991 | Brusasco ............................ 49/502 X |
| 5,092,647 | 3/1992 | Ueda et al. ........................... 296/146 |
| 5,379,553 | 1/1995 | Kimura et al. ......................... 49/502 |
| 5,446,999 | 9/1995 | Inaba et al. ............................ 49/502 |
| 5,529,370 | 6/1996 | Veit .................................... 49/502 X |
| 5,584,144 | 12/1996 | Hisano .......................... 296/146.7 X |
| 5,868,421 | 2/1999 | Eyrainer ............................. 280/730.2 |
| 5,870,191 | 10/1998 | Blakewood et al. .......... 296/146.7 X |

FOREIGN PATENT DOCUMENTS

| 3928685 | of 0000 | (DE) . |
| 3239370 | 9/1983 | (DE) . |
| 3529660 | 2/1986 | (DE) . |
| 8309452 | 11/1986 | (DE) . |
| 4244346 | 7/1993 | (DE) . |
| 4408287 | 1/1995 | (DE) . |
| 318640 | 6/1989 | (EP) . |
| 0427152 | 5/1991 | (EP) . |
| 0579535 | 1/1994 | (EP) . |
| 1272752 | 11/1974 | (GB) . |

Primary Examiner—Jerry Redman
(74) Attorney, Agent, or Firm—Christie, Parker & Hale, LLP

(57) ABSTRACT

A vehicle door in modular structure including a door shell which is completed by an assembly-bearing support plate and a single or multi-part inner door lining. The vehicle door includes a twin-shell door shell with an outer door panel and inner door panel which are connected together along their edges wherein the inner door panel has a cut-out section which is covered substantially by a support plate with functional units mounted thereon, such as window lift mechanism, lock, and cable tree. A lining body covers the door on the inside, and at least one part of the lining body is in preassembled connection with the support plate. A cover frame covers the connecting points between the lining body and support plate or inner door panel and support plate.

24 Claims, 2 Drawing Sheets

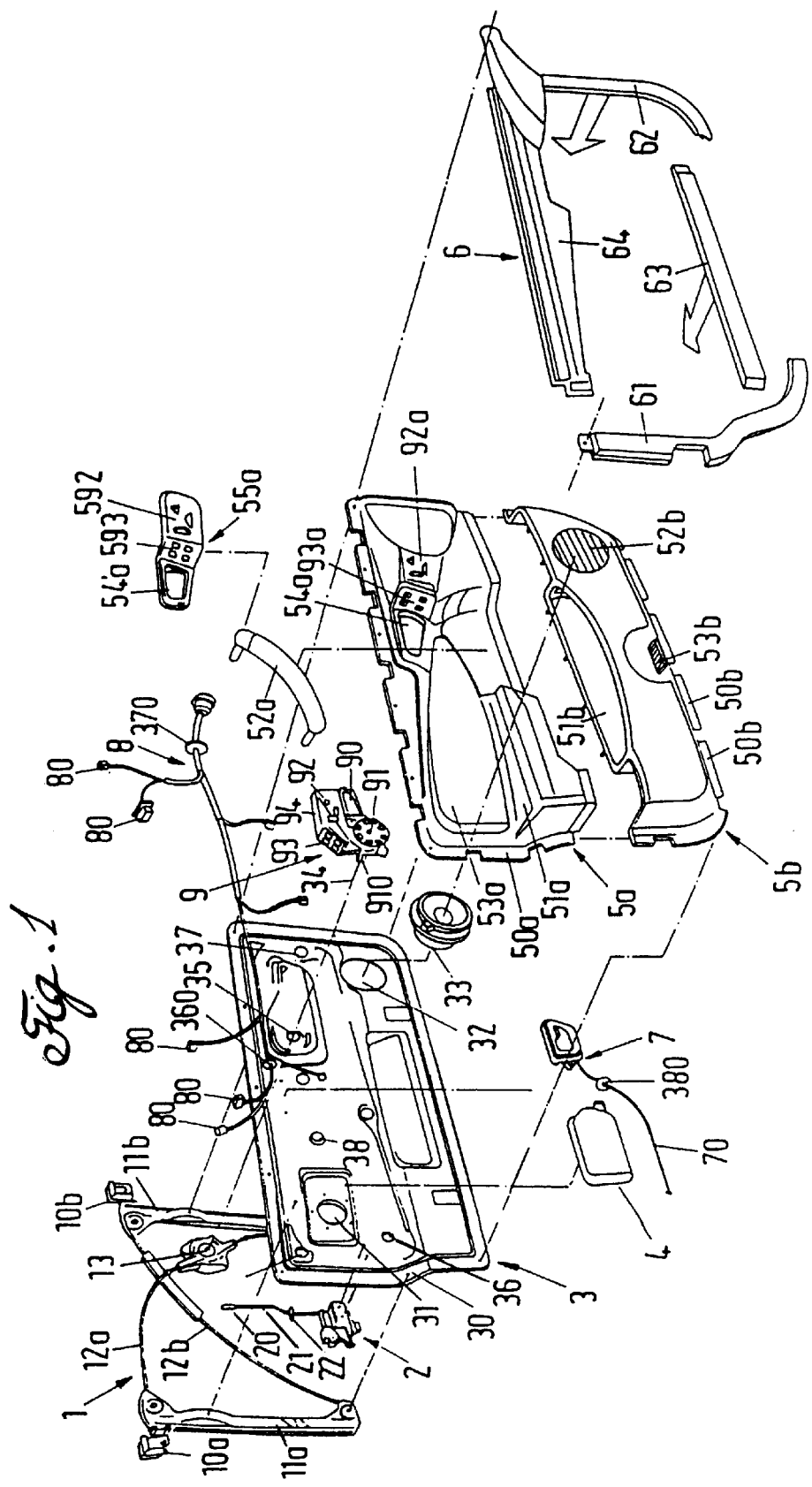

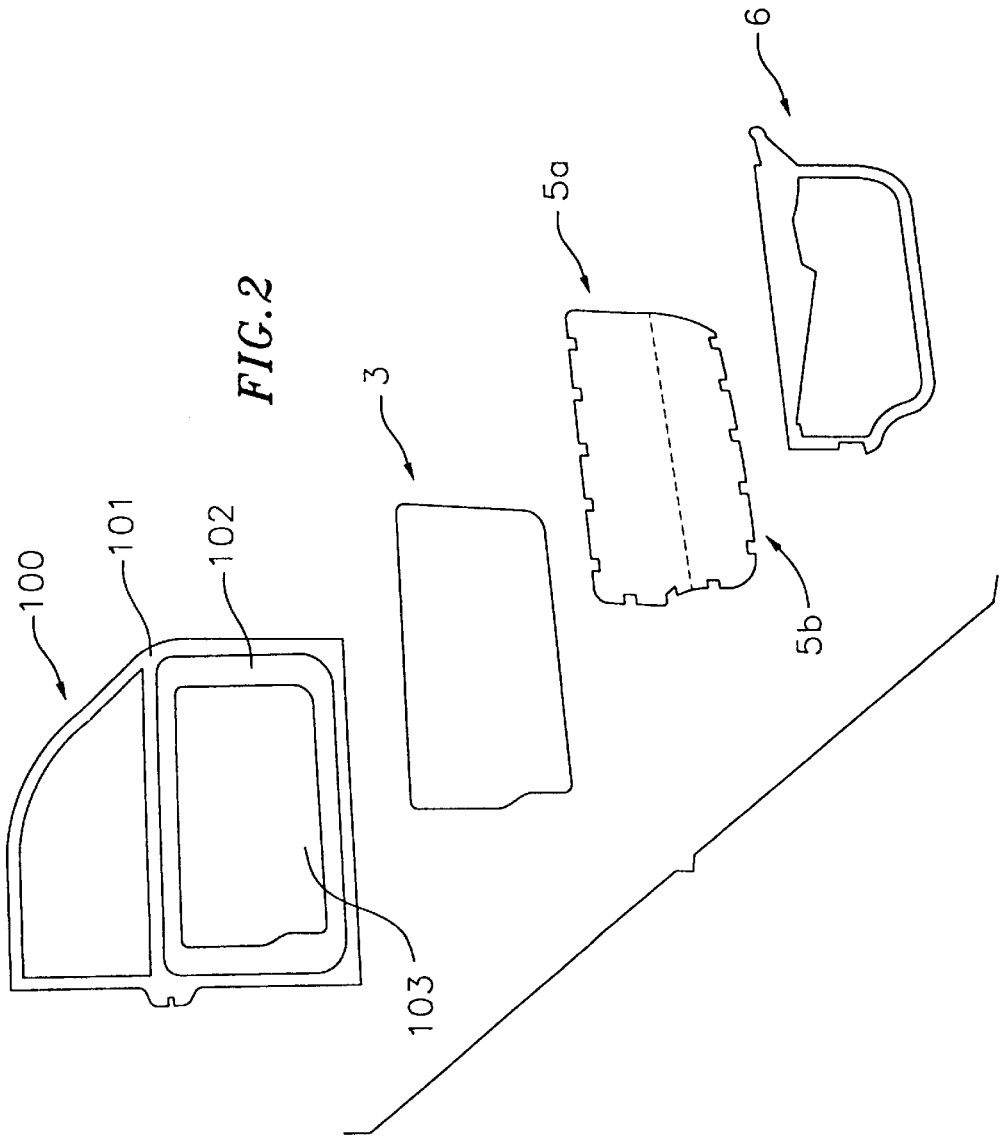

VEHICLE DOOR

BACKGROUND

The invention relates to a vehicle door in modular structure having a door shell including an assembly-bearing support plate and a single or multi-part inner door lining.

German Patent No. C2 35 29 660 discloses a vehicle door which has a cut-out section in the inner door panel which is completely covered by a support plate. Pre-fitted on the side of the support plate facing the vehicle interior is a cable tree with several branches having ends carrying plugs. On the circumference of the support plate there are several holes through which a screw connection can be made with the inner door panel. The vehicle door is completed by a one-piece inner lining part which is Lixable on the body of the door shell in the usual way by hanging and/or clip connections.

The disadvantage here is that the inner door lining must be self-supporting and of a relatively high mechanical stability since only comparatively light forces can be transferred through the clip connections along the edge. Accessory parts or functional elements which are in direct connection with the inner door lining, such as for example a switch block inserted in the lining body, can only be checked for their functional interaction with the attached structural groups after the cable connections have been completed. Such construction is prone to assembly errors, particularly in the case of blind fitting time, and incur considerable refinishing costs.

European Patent Publication 0 427 152 discloses a vehicle door having an inner panel with a transverse cut-out section which is closed by a support plate fitted with a window lift mechanism and a lock. The support plate can be made in one piece from plastic and has an upper inner lining body on the surface facing the passenger area. Recesses are formed in the lower contour of the cut-out section in the inner door panel in order to provide the connection between the window pane and the window lift mechanism or to fold a guide rail for the window pane into the operating position. A separate lining body is provided for covering the lower door area.

A disadvantage here is that in order to transfer the displacement forces of the window lift system, a comparatively thick construction has to be provided for the one-piece plastics support. This has a negative effect on the generally tight spatial restrictions in the door breast area. Furthermore, the solution illustrated is only suitable for producing extremely simple design variations; wider qualitative variations are in practice not possible. Since the electrical and electronic components are only provided in the wet space of the door, corresponding high costs must be incurred to provide reliable sealing of the electrical and electronic components against moisture.

German Patent No. 83 09 452.0 discloses a vehicle door which has an inner door lining which is foldable in part. The access which thereby becomes free in the inside of the door can be used for fitting or dismantling the window pane in relation to the holding device for the window lift mechanism. The technical solution described has, however, the disadvantage of a very severely restricted freedom of design.

German Patent No. 42 44 346 discloses a vehicle door with modular structure. Here a module consisting of a window lift system and window pane is inserted in the inside of the door and screwed to the inner door panel. The inner door lining is then fitted with at least one screw connection provided between the inner door lining and the module support in the area of the grab handle in order to increase mechanical stability. Such connecting points each require separate covers in the visible area for aesthetic reasons.

German Patent No. 32 39 370 describes a vehicle door with a large cut-out section in the inner door panel which is to be covered by a modular support. Before the modular support is connected to the door body it has to be fitted with a number of functional units such as for example window lift, lock and operating handle for the door lock. Furthermore it is intended to pre-fit the entire inner door lining. However, no concrete details are provided regarding the type and manner of producing the connection or dealing with the connecting points.

European Patent Publication No. 0 579 535 A1 discloses a method for assembling a motor vehicle door wherein first a support plate is fitted together with further function elements on a recess in the inner door panel and is then covered by an inner door lining wherein the connecting points between the support plate and inner door panel are covered. This method has the drawback that the support plate and inner door lining form no premountable structural group which can be inserted as a complete module in a motor vehicle door.

SUMMARY

According to an embodiment of the invention, it is possible to provide a vehicle door with a modular structure which is characterized by an increased degree of integration of functional components or component parts so that a preassembled and completely pre-checkable unit is formed which can be inserted in the door shell. Furthermore, according to the invention it is possible to guarantee an increased number of variations regarding the design of the inner door lining at low cost and also a reduced assembly time and expenditure. The structure of such a door leads to a simplification of the assembly processes and thus to a reduction in the rate of error.

A vehicle door according to one embodiment of the invention has an inside face and includes a twin-shell door shell with an outer door panel and an inner door panel which are connected together in a shared edge area. The inner door panel has a cut-out section which is covered substantially by a support plate having a plurality of functional units mounted thereon, such as a window lift mechanism, lock, cable tree or the like. The support plate substantially covers the cut-out section of the inner door panel. A lining body covers the door on the inside face. At least a part of the lining body is in preassembled connection with the support plate. At least one cover strip is provided for covering a plurality of connecting points between the support plate and at least one of the inner door panel and the lining body. The cover strip may be several pieces or a single cover frame.

According to another embodiment, at least one part of the inner door lining is connected to the support plate prior to fitting the support plate into the door shell. When using a multi-part lining body preferably all these parts should be in preassembled connection with the support plate.

This not only achieves a degree of integration of the door module which is increased by the parts of the lining body; but also the expansion relates to those parts and components which are normally in direct connection with the lining body, such as for example switch units, exit lights integrated in the base area, internal lock controls with fascia panel, as well as separate grab handles.

The significantly higher degree of integration of the door module which can be achieved according to the invention not only permits a simpler more effective assembly of the parts, as could take place in the door already hung in the vehicle, but also provides a completely pre-checkable functional module with all the important functional units and structural groups. This module can contain in addition to the window lift mechanism and inner door lining, an airbag, inner lock controls, central locking unit, electronic control unit, speakers, a separate grab handle, as well as further accessories which are essential to the design. Compared with other door designs in which assembly is carried out inside the door body, according to the present invention, assembly operations can be carried out on both sides of the door module and concealed (blind) assembly processes are avoided. This reduces the likelihood of assembly errors which lowers the finishing costs. The pre-checkability of the integrated functional units and structural groups prior to installing the door module into the door shell makes it possible to ensure a very high quality standard.

Thus the pre-assembled door module according to an embodiment of the invention forms the most complex system part of the vehicle door wherein, after its installation into the door shell and its completion through the window pane, only the seals, external handle and external mirror need be fitted. Correspondingly few parts still remain to be checked.

A further advantage of a door module according to the invention arises from the improved possibilities of connection between the lining body and the support plate of the door module. Since the corresponding connecting points according to a preferred variation of the invention are to be covered by a cover frame or by individual cover strips, screw or rivet connections can also be used. This provides the lining body with a particularly good hold and improved stability so that where applicable, a self-supporting design of the lining body can be dispensed with. A lower material use is thereby possible whereby a reduction in weight can also be achieved. Preferably, in addition to the fixing points in the edge area, further fixing points can also be provided in the central area of the lining body to ensure a further improvement in stability. A screw connection is thereby preferably inserted from the side of the support plate but does not reach right through so that this screw connection remains invisible from the side of the passenger area (even without a cover).

The cover frame or cover strips already mentioned are attached to the edge area of the inner door lining by using clips or the like after the door module has been fitted into the door shell. Since the cover frame need not undertake any supporting function, the connecting points can be made relatively simple. With this structure not only can a variety of different designs be formed by the cover strips, but in the event of possible damage and dirtying which mostly happens along the edge area it is also possible to replace the relevant parts easily and cost-effectively.

It is advantageous to construct the inner door lining using an upper lining body and lower lining body wherein the upper lining body for improved aesthetic reasons can be made from higher quality material and covered where required by fabric and other decor materials. The lower lining body can be made from a lower quality material and need not be provided in so many variations. Thus improved combinations can be achieved which meet the design wishes and are at the same time cost-effective.

In order to allow the connection between the window lift mechanism and window pane to be made even after the installation of the support plate into the door shell, one or more openings are provided in the upper area of the inner door panel (near the breast) which can then be closed in a water-tight manner through a cover strip or cover frame.

According to a preferred embodiment of the invention, the support plate completely covers the cut-out section in the inner door panel and supports a seal in its edge area. Similarly the holes provided for passing through the cable ends and drive axles are sealed by sealing elements. A hermetical separation is thereby achieved between the wet space lying between the inner door panel and support plate and the adjoining dry space lying between support plate and inner door lining. Thus the mechanical, electrical and electronic units lying solely in the dry space can be formed in a more cost-effective dry space version. According to one embodiment of the invention, this relates to the drive and control unit consisting of gearing, electric motor, or drive unit, electronic control unit, and switch units as well as various electrical plug connections. Also the electrical connection for the side airbag is mounted in the dry space whereby a possible failure through penetrating dampness can be ruled out.

BRIEF DESCRIPTION OF THE DRAWING

The invention will now be explained in further detail with reference to the embodiment shown in the drawings where:

FIG. 1 is an exploded view of a door module according to an embodiment of the invention.

FIG. 2 is similar to FIG. 1 but schematically illustrating an exploded view of a twin-shell vehicle door and components of the door module.

DETAILED DESCRIPTION

The figure shows a door module in an exploded view which consists of sub-systems including a double-strand cable window lift 1, a lock 2, a support plate 3, a side airbag 4, a inner door lining 5a, 5b with a cover frame 6, an internal lock operating mechanism 7, a cable tree 8, and a drive and control device 9. Furthermore a speaker 33 for fixing on the support plate 3 and a grab handle 52a as well as a fascia panel 55a are provided which are to be assembled in the upper lining body 5a of the inner door lining.

In order to ensure a hermetic separation of the hollow cavity enclosed by the door body into a dry space(facing the exterior of the vehicle), and a wet space the support plate 3 completely covers the cut-out section in the inner door panel (not shown) and a seal provided on the circumferential fastening flange 30 prevents dampness from entering. The support plate 3 is designed as an imprinted punched part with holes 35,36,37,38 for passing through the cable ends of the cable tree 8, a drive shaft 910 and a security rod linkage 21. A larger opening 32 is provided to accommodate the speaker 33. A pot-shaped imprinted socket 31 is formed in the upper A-column side area for the side airbag 4 (wherein the "A-column side" is the portion of the door frame in the vehicle body nearest the front of the vehicle). Thus the support plate 3 serves as a supporting surface in the event of the side airbag unfolding. Further molded areas can be formed for example in the area of the card pocket 51b or for the purpose of integrating a side impact protection support structure into the support plate 3.

According to the embodiment illustrated in FIG. 1, the double-strand cable window lift mechanism 1 is fixed on the wet space side of the support plate 3. This can be achieved for example by means of rivet connections through guide rails 11a, 11b at whose ends are provided guide pulleys for the cable loop (not shown) guided in Bowden 12a, 12b.

Bowden window regulators, which are well known in the art, use a cable surrounded by a sheath or casing wherein the body of the sheath or casing is unsupported in space. In this way, the cable can be moved within the sheath or casing when the window crank or other type of drive is activated.

In the area of the guide rails 11a, 11b, the cable loop is in fixed connection with displaceably mounted entrainment members (not shown) which support the pane fittings 10a, 10b. The window lift member 1 is in turn connected to the window pane (not shown) through the pane fittings 10a, 10b. The drive moment is transferred to the cable loop by the cable drum 13 mounted in a housing.

When using other types of window lift systems (e.g., arm window lift member) the position of the passage of the drive shaft 910 through the support plate 3 is to be adapted to the structural features available.

The lock 2 is Located on the wet space side of the support plate 3. Its security rod linkage 21 with the security knob, engages through a hole 210 in the support plate 3, wherein a preferably socket-type sealing element 22 ensures a watertight closure. The lock 2 is supplied with electrical energy through one of the several plugs 80 which are connected to the free ends of the cable tree 8 and are guided through the hole 36.

Above the opening 32 for the loud speaker 33, the drive and control unit 9 is mounted on the support plate 3 wherein the drive shaft 910 passes through the hole 35 on an axis 34 so that a force-transferring connection is produced with the cable drum 13 which likewise lies on the axis 34. The drive and control unit 9 includes an electric motor 90, a translation gearing 91, an electronics unit 94, and switches 92, 93, themselves forming a very compact precheckable unit. The switches 93 are provided for controlling the window lift mechanism, and the switch 92 is associated with an electrically operated seat adjustment. By integrating the window lift electronics, window lift switches, and seat switches (and where applicable seat electronics) in one housing, it is possible to reduce hardware and cabling costs. More cost-effective design variations can also be used by mounting moisture-sensitive components on the dry space side.

After the internal lock operating mechanism 7 is mounted on the support plate 3, its Bowden 70 (or rod linkage 9) passes through hole 36 is connected to the lock 2, and is closed by a sealing element 380. The lining bodies 5a, 5b of the inner lining can then be fixed on the support plate 3. This is carried out using a fastening flange 50a, 50b provided around the edges of the lining bodies, preferably by means of clip connections.

In the area of a cover 53a for the side airbag 4, the lining material has an ideal break point which, in the event of the side airbag 4 being released, allows it to unfold. An arm rest 51a adjoining the cover 53a on its underside can be locked in order to increase the mechanical stability e.g., using a screw connection fitted from outside of the support plate 3. Fitting from outside of the support plates also applies in an analogous way to the separate grab handle 52a so that the fixing points do not appear visible from the passenger area.

The upper lining body 5a has a recess 54a for the handle of the internal lock operating mechanism 7 as well as recesses 92a, 93a for the switches 92,93. In the present embodiment, for design reasons an additional fascia panel 55a is provided with fascia areas 54′a, 592, 593 for this area.

The lower lining body 5b preferably has a simple and more cost-effective design than the upper lining body 5a and is for example made entirely from plastics. It includes an exit light 53b as well as the card pocket 5b and a speaker cover 52b.

A cover frame 6 consisting of individual cover strips 61,62,63,64 covers the fixing flanges 50a, 50b. By varying the geometric designs of the cover strips 61,62,63,64, it is easily possible to change the design of the door. The cover frame can naturally also be made in one piece.

Thus the invention provides with simple technical means a door 100 module for a twin-shell vehicle door which allows a substantially increased degree of integration. More particularly, functional groups and component parts can be supplied preassembled and prechecked on a support plate to the door shell which previously owing to their restricted functional connection with the inner door lining could only be assembled on simultaneously with the door.

FIG. 2 illustrates schematically the arrangement of the twin-shell vehicle door 100, including an outer door panel 101 and an inner door panel 102 with a cut-out 103, the support plate 3, the upper lining body 5a and lower lining body 5b, and the cover frame 6 prior to assembly.

Finally it should be pointed out that in order to produce the connection between the window lift mechanism 1 and window pane it is necessary to provide assembly openings and these are not shown. They can be provided either in the breast area of the inner door panel or in the upper edge area of the support plate 3. The covering of the assembly openings is provided by the cover strip 64.

What is claimed is:

1. A vehicle door for a vehicle having an interior, comprising:

a twin-shell door shell including an outer door panel having an interior side to face the interior of the vehicle and an inner door panel having an interior side to face the interior of the vehicle, the inner door panel located interior of the outer door panel, the outer door panel and the inner door panel connected together in a shared edge area, the inner door panel having a cut-out section;

a support plate, with a plurality of functional units mounted thereon, and having an interior side to face the interior of the vehicle, the support plate located interior of the inner door panel such that it substantially covers the cut-out section of the inner door panel interior of the inner door panel;

a lining body having an interior side to face the interior of the vehicle, the lining body covering the door interior of the support plate, wherein at least a part of the lining body is assemblable to the support plate prior to the support plate covering the cut-out section of the inner door panel;

a plurality of fasteners holding in contact the support plate and the lining body and exposed interior of the lining body; and at least one cover strip interior of the lining body covering the exposed plurality of fasteners.

2. The vehicle door according to claim 1, wherein the plurality of fasteners are clip connections.

3. The vehicle door according to claim 1, further comprising a plurality of fixing holes in the lining body for attaching parts to the lining body, wherein the plurality of fixing holes are blind holes with openings pointing in the direction of the support plate to enable assembly from a back side of the support plate.

4. The vehicle door according to claim 1, wherein the lining body comprises an upper part and a lower part, wherein the upper part is made from a higher quality material than the lower part.

5. The vehicle door according to claim 4, wherein the lower part of the lining body consists entirely of plastics.

6. The vehicle door according to claim 4, wherein the upper and lower parts of the lining body are separately demountable.

7. The vehicle door according to claim 4, wherein the upper part of the lining body is covered, at least partially, with a covering material.

8. The vehicle door according to claim 1, further comprising a window lift mechanism including an electric drive unit, gearing, and an electronic control unit, and switches for at least one of the window lift mechanism and a seat adjustment mechanism, wherein said electric drive unit, gearing, electronic control unit, and switches form a structurally cohesive unit, and wherein one or more apertures are provided in a switch area of the lining body for the switches.

9. The vehicle door according to claim 8, wherein the switch area is covered by a fascia panel.

10. The vehicle door according to claim 9, further comprising an internal lock operating mechanism, wherein a frame cover for the internal lock operating mechanism is molded on the fascia panel.

11. The vehicle door according to claim 8, wherein the electrical drive unit for the window lift mechanism and the electronic control unit are mounted in a dry space formed between the support plate and the lining body.

12. The vehicle door according to claim 11, further comprising a window lift mechanism including a cable drum with a housing and a drive shaft, wherein the drive shaft passes through a hole provided in the support plate, and wherein a seal is provided between said hole in the support plate and at least one of the gearing and the housing of the cable drum.

13. The vehicle door according to claim 1, wherein the support plate supports, on a side adjacent the lining body, a side airbag which is associated with a cover provided on the lining body (5a), wherein the cover has an ideal break point for allowing unfolding of the side airbag.

14. The vehicle door according to claim 1, wherein the support plate comprises a fixing flange on an outer edge, and wherein the support plate completely covers the cut-out section in the inner door panel and seals the cut-out section with a seal running along the fixing flange.

15. The vehicle door according to claim 1, further comprising a cable tree with a plurality of individual cable ends, a Bowden, and a rod linkage, wherein the support plate has a plurality of openings for passing through at least one of the cable tree, the plurality of individual cable ends of the cable tree, the Bowden, and the rod linkage, wherein each of said plurality of openings is sealed by a separate sealing element.

16. The vehicle door according to claim 1, wherein the lining body is not self-supporting in the door and its stability is only obtained by its connection with the support plate.

17. The vehicle door according to claim 1, wherein the plurality of functional units comprise a window lift mechanism, a lock, and a cable tree.

18. The vehicle door according to claim 1, further comprising at least one additional cover strip covering the connecting points.

19. The vehicle door according to claim 1, wherein the cover slip is a cover frame consisting of one piece which covers the plurality of connecting points.

20. The vehicle door according to claim 1 wherein at least one of the fastening points are along a first side and another of the fastening points is along a second side perpendicular to the first side.

21. The vehicle door according to claim 20 comprising a first cover strip covering the fastening points along the first side and a second cover strip covering the fastening points along the second side.

22. A vehicle door for a vehicle having an interior comprising:
a twin-shell door shell including an outer door panel having an interior side to face the interior of the vehicle and an inner door panel having an interior side to face the interior of the vehicle, the inner door panel located interior of the outer door panel, the outer door panel and the inner door panel connected together in a shared edge area, the inner door panel having a cut-out section;
a support plate, with a plurality of functional units mounted thereon and having an interior side to face the interior of the vehicle, the support plate located interior of the inner door panel such that it substantially covers the cut-out section of the inner door panel interior of the inner door panel;
a lining body interior of the support plate, wherein at least a part of the lining body is assemblable to the support plate prior to the support plate covering the cut-cut section of the inner door panel;
a plurality of fasteners holding in contact the support plate and the lining body; and
at least one cover strip covering the plurality of fasteners, wherein the cover strip is located interior of the lining body.

23. A vehicle door for a vehicle having an interior comprising:
a twin-shell door shell including an outer door panel having an interior side to face the interior of the vehicle and an inner door panel having an interior side to face the interior of the vehicle, the inner door panel located interior of the outer door panel, the outer door panel and the inner door panel connected together in a shared edge area, the inner door panel having a cut-out section;
a support plate, with a plurality of functional units mounted thereon, and having an interior side to face the interior of the vehicle, the support plate located interior of the inner door panel such that it substantially covers the cut-out section of the inner door panel interior of the inner door panel;
a lining body interior of the support plate;
a first connection connecting together at least a part of the lining body and the support plate to form a support plate unit;
a second connection connecting together the support plate unit and the twin-shell door shell, wherein the first and the second connections are at different locations; and
at least one cover strip covering at least one of the first and second connections, wherein the cover strip is located interior of the lining body.

24. The door of claim 23 wherein the at least one cover strip is around a substantially full periphery of the lining body.

* * * * *